April 17, 1928.  1,666,373
F. S. FELDHEIM
SPRING STEEL TIRE
Filed Oct. 1, 1926
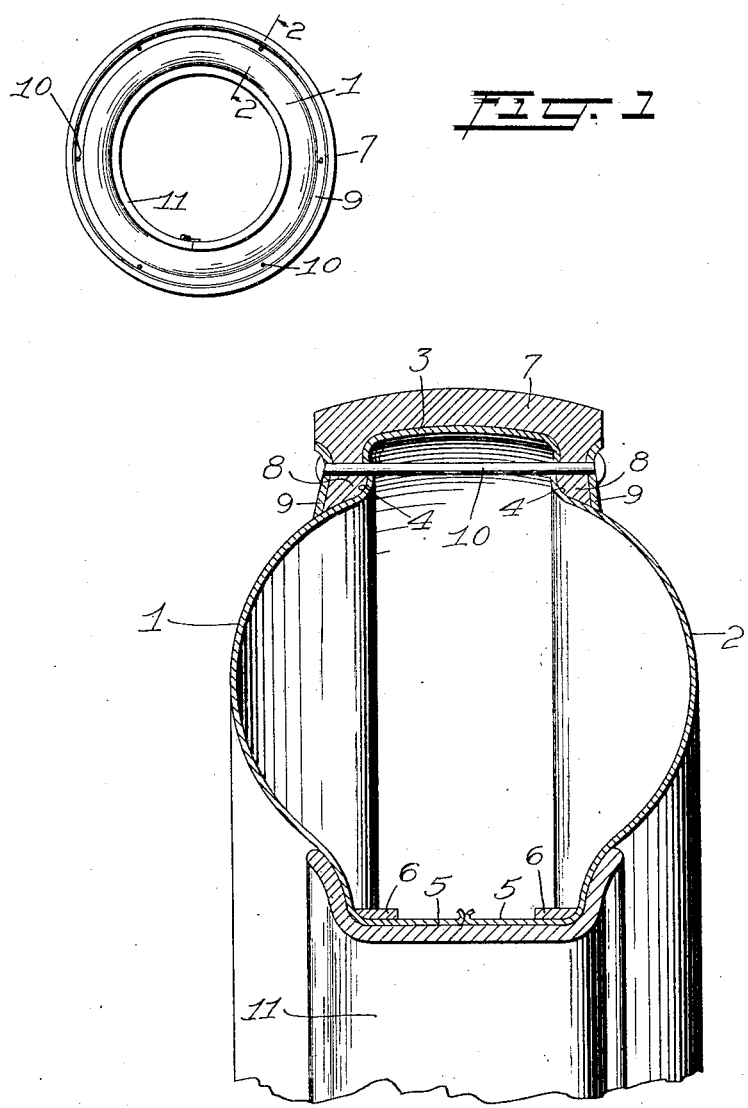
INVENTOR
F. S. FELDHEIM
BY
ATTORNEYS Patented Apr. 17, 1928.

1,666,373

UNITED STATES PATENT OFFICE.

FELIX S. FELDHEIM, OF EVANSTON, ILLINOIS, ASSIGNOR OF ONE-HALF TO VICTOR KARBOWSKI, OF CHICAGO, ILLINOIS.

SPRING STEEL TIRE.

Application filed October 1, 1926. Serial No. 133,838.

My invention relates to improvements in spring steel tires, and it consists in the combinations, constructions, and arrangements herein described and claimed.

An object of my invention is to provide a spring steel tire which is resilient, and in which the pressure is distributed evenly throughout the tire.

A further object of my invention is to provide a device of the type described which is puncture-proof and which is free from blow-outs.

A further object of my invention is to provide a device of the type described which is economical in that metal is substituted for rubber, and that one thickness of metal is used instead of several thicknesses of rubber and fabric.

A further object of my invention is to provide a device of the type described which obviates the need of inner tubes.

A further object of my invention is to provide a device of the type described in which the steel portion will last permanently, the rubber tread being removable, therefore permitting a new tread to be placed thereupon.

Other objects and advantages will appear in the following specification, and the novel features of the invention will be particularly pointed out in the appended claims.

My invention is illustrated in the accompanying drawings, forming part of this application, in which Figure 1 is a side elevation of the device applied to a vehicle rim, and Figure 2 is an enlarged section along the line 2—2 of Figure 1.

In carrying out my invention, I provide a body portion having resilient side portions 1 and 2. The side portions 1 and 2 are arcuate-shaped in cross section and have their centers spaced apart. An annular head portion 3 is provided and is arcuate-shaped in cross section. Annular grooved portions 4 are disposed between the head portion 3 and the resilient side portions 1 and 2.

Integral with the side portions 1 and 2 and extending inwardly therefrom are flange portions 5. The edges of the flange portions 5 are bent inwardly toward the head portion 3 and backwardly toward the side portions 1 and 2. Reinforcing rings 6 are disposed upon the flange portions 5 adjacent the inner walls of the side portions 1 and 2.

A tread 7 which is constructed of relatively hard rubber is provided with inwardly extending bead portions 8. The bead portions 8 are receivable within the grooved portions 4. Retainer rings 9 which are constructed of any suitable material are disposed adjacent the outer surface of the bead portions 8 and permitted to rest upon the side portions 1 and 2. The tread 7, together with the bead portions 8 and the retainer rings 9, is secured in place by rivets or bolts 10 which are passed through openings therein.

From the foregoing description of the various parts of the device, the operation thereof may be readily understood. The body portion may be disposed upon a rim which is indicated at 11 in the manner in which the ordinary vehicle tires are disposed thereupon. When the rim 11 is in place, the flanges 5 rest upon the rim and the reinforcing rings 6 tend to hold the flanges in place. The edges of the flanges 5 prevent inward movement of the flanges.

The spacing apart of the centers of the arcuate-shaped side portions increases the resiliency thereof. Furthermore, pressure upon one portion of the tread 7 will be distributed evenly throughout the body portion. The tread 7 may be permanently secured to the body portion by means of rivets, or if desired, it may be removably secured to the body portion by means of bolts. It is obvious that the body portion will last permanently, and if desired, the tread 7 when worn may be removed and a new tread placed thereupon.

I claim:

1. A device of the type described comprising a body portion having resilient side portions, an annular head portion, and annular grooved portions disposed between said side portions and said head portion, a tread disposed upon said head portion, bead portions integral with said tread and receivable in said grooved portions, retainer rings disposed adjacent said bead portions, means extending through said grooved portions, said bead portions, and cooperating with said retainer rings for securing said tread in place, inwardly extending flange portions integral with said side portions, and reinforcing rings disposed upon said flange portions adjacent the inner walls of said side portions.

2. A device of the type described comprising a body portion constructed of a resilient material of relatively equal thickness throughout, and having side portions, an annular head portion, annular grooved portions disposed between said side portions and said head portion, and flange portions extending inwardly from said side portions, reinforcing rings disposed adjacent said flange portions, an annular tread disposed upon said head portion, inwardly extending bead portions integral with said tread and receivable in said annular grooved portions, retainer rings disposed adjacent said bead portions, and means extending through said grooved portions, said bead portions, and co-operating with said retainer rings for securing said tread in place, said retainer rings engaging with said side portions and arranged to support the outer portions of said tread.

FELIX S. FELDHEIM.